Jan. 13, 1953     I. MENDELSON     2,625,659
VIBRATION TESTING APPARATUS
Filed Sept. 28, 1946
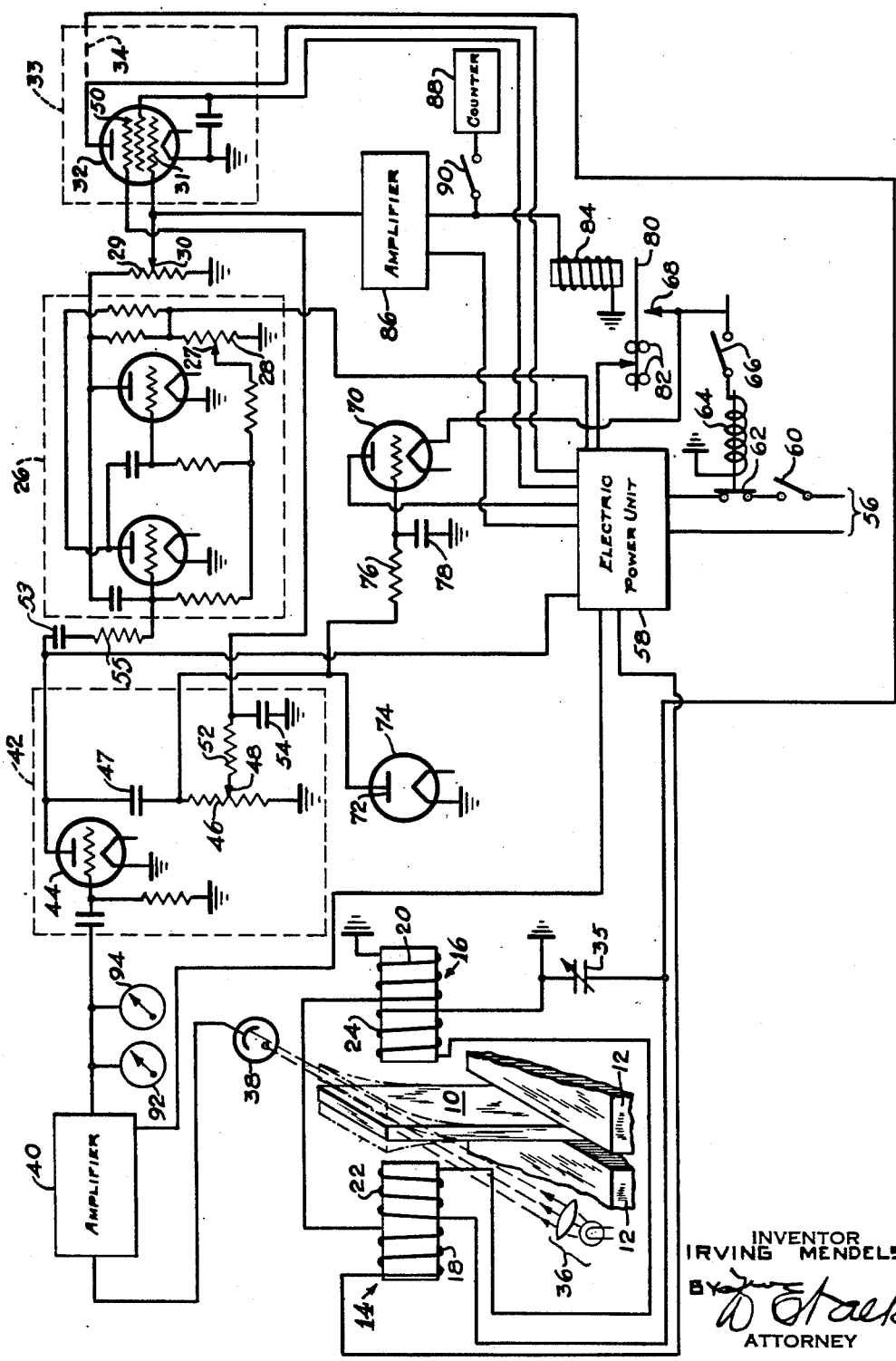
INVENTOR
IRVING MENDELSON
BY
ATTORNEY Patented Jan. 13, 1953

2,625,659

UNITED STATES PATENT OFFICE 2,625,659

VIBRATION TESTING APPARATUS

Irving Mendelson, Paterson, N. J., assignor to Curtiss-Wright Corporation, a corporation of Delaware Application September 28, 1946, Serial No. 700,090

2 Claims. (Cl. 250—201)

This invention relates to vibration testing apparatus and is particularly directed to apparatus for determining the vibration and fatigue characteristics of materials.

In mechanisms—as for example, an engine—when the forced vibration of a particular member of a mechanism becomes synchronous with one of its natural frequencies of vibration, failure of the member is likely to occur. Accordingly, a knowledge of the natural frequency or frequencies of the member and its fatigue characteristics at these frequencies are extremely valuable for its proper design.

An object of this invention is the provision of novel vibration apparatus means for insuring vibration of the test specimen at one of its natural frequencies. To this end, with the present invention, a pick-up device responsive to the frequency of vibration of the test specimen itself controls the frequency of the pulsating force exciting vibration of the test specimens.

A further object of the invention comprises the provision of a frequency pick-up device which is responsive only to the vibration of the test specimen itself and not to the force field causing vibration of the test specimen.

In accordance with this invention, vibration of the test specimen controls the frequency of the pulsating electric current output of a photoelectric cell which, in turn, controls the frequency of the electric current forcing vibration of the test specimen.

Specifically, applicant's invention comprises magnetic means for forcing vibration of the test specimen, a vacuum tube oscillator for controlling the frequency of the energizing current of said magnetic means and a photo-electric cell having the frequency of its pulsating electric current output controlled by vibration of the test specimen, this frequency fixing the output frequency of said oscillator. With this arrangement, the photo-electric cell pick-up device is responsive directly to the vibration of the test specimen and is unaffected by the magnetic field exciting vibration of the test specimen.

Other objects of the invention will become apparent upon reading the annexed detailed description in connection with the drawing.

Referring to the drawing, a test specimen 10 is fixed at one end between jaws 12 or by other suitable means, the free end of the specimen extending between the facing ends of a pair of magnets 14 and 16. The magnets 14 and 16 are provided with windings 18 and 20 to which a source of direct electric current is connected. In addition, the magnets are provided with windings 22 and 24 to which the electric current of a predetermined frequency is supplied. The arrangement is such that, in one direction of alternating current flow through the windings 22 and 24, the magnetic flux in the magnet 14 resulting from alternating current winding 22 adds to the magnetic flux resulting from the direct current winding 18 while, in the magnet 16, the magnetic flux resulting from the alternating current winding 24 subtracts from the magnetic flux resulting from the direct current winding 20. When the alternating current flow reverses, this addition and subtraction of magnetic flux is also reversed with respect to the magnets 14 and 16. With this arrangement, the test specimen is subjected to the varying pulls of the two magnets 14 and 16. When the frequency of the pulsating magnetic force, to which the test specimen is thus subjected, differs from any natural frequency of the test specimen, there is substantially no resulting vibration of the test specimen. However, when the frequency of the pulsating magnetic force is equal to a natural frequency of the test specimen vibrations of substantial amplitude are induced therein.

The frequency of the alternating current supplied to the windings 22 and 24 is controlled by a conventional vacuum tube oscillator 26 which, as illustrated, is of the multi-vibrator type. The oscillator frequency is initially adjusted by moving a contact 27 along a resistance 28 as is conventional in such type oscillators.

The pulsating electric output of the oscillator 26 is connected to a grounded resistance 29 and a contact 30 adjustable along the resistance 29 is connected to a grid 31 of a vacuum tube 32 comprising the first stage of an amplifier 33. The amplifier 33 may include additional stages, designated schematically by the dash line 34. The amplitude of the output of the amplifier 33 can be controlled by adjustment of the contact 30 along the resistance 29 and its output is connected to the magnet windings 22 and 24 as illustrated. Preferably, an adjustable condenser 35 is connected across the serially connected windings 22 and 24. By adjusting the capacity of the condenser 35, the electric circuit, including the condenser 35 and the windings 22 and 24, may be tuned to resonance in order to provide for maximum current flow through the magnet windings 22 and 24 in relation to the amount of electric energy supplied thereto by the amplifier 33.

The test specimen 10 is also disposed between a light source 36 arranged to direct a beam of parallel light rays toward a photo-electric cell 38 or equivalent light sensitive electric means. The arrangement is such that vibrations of the test specimen 10 cause corresponding variations in the quantity of light falling on the photo-electric cell 38 whereby the electric current output of the photo-electric cell varies with a frequency equal to the frequency of vibration of the test specimen 10 and at the same time, the amplitude of the pulsations of the output current of the photo-electric cell 38 is proportional to the amplitude of vibration of the test specimen. As illustrated, when the test specimen 10 is not vibrating, the specimen extends part way into the light beam directed toward the photo-electric cell so that as viewed in the drawing only the right hand portion of the photo-sensitive surface of said cell is exposed to said light beam. With this arrangement, when the specimen 10 deflects to the right or left, as viewed in the drawing, the quantity of light striking the photo-electric cell 38 is respectively decreased or increased in proportion to the extent of the deflection of said specimen and at a frequency equal to the frequency of said deflection whereby the frequency and amplitude of the pulsating output current of the photo-electric cell is equal respectively to the frequency and amplitude of vibration of the test specimen. Obviously, instead of interposing the test specimen between the light source and photo-electric cell, a mirror may be secured to the test specimen for directing the light from the light source toward the photo-electric cell.

The pulsations in the output of the photo-electric cell 38 are amplified by a vacuum tube amplifier 40 and this amplified signal is then fed into a conventional form of automatic volume control circuit 42 (A. V. C. circuit) such as are continually used in modern radio receivers. The specific details of the A. V. C. circuit form no part of the invention.

As illustrated, the A. V. C. circuit 42 simply comprises a vacuum tube 44 having a grounded resistance 46 and a condenser 47 in its plate circuit so arranged that the electric potential along the resistance 46 is always negative. A contact 48 adjustable along the resistance 46 is connected to a grid 50 of the amplifier tube 32. The connection between the contact 48 and the grid 50 includes a filter comprising a resistance 52 and a condenser 54 for removing the pulsating component of the potential of the contact 48 from the grid 50. With this arrangement, the negative potential of the contact 48 and, therefore, the negative potential of the grid 50 increases with increase in the output signal of the tube 44 thereby decreasing the amplification of the tube 32. Similarly, a decrease in the output signal of the tube 44 results in the potential of the grid 50 increasing in a positive direction thereby increasing the amplification effected by the tube 32. The magnitude of this automatic volume control depends on the adjustment of the contact 48. Thus, the further away the contact 48 is adjusted from the grounded end of the resistance 46, the more effective is the automatic volume control. In this way, the A. V. C. circuit 42 may be adjusted so that the output of the amplifier 33 is substantially constant in spite of small variations in the amplitude of the test specimen. The output of the A. V. C. circuit tube 44 is also connected through a condenser 53 and a resistance 55 to the grid of one of the vacuum tubes of the multi-vibrator type oscillator 26 so as to fix or lock in the oscillator frequency to the output frequency of the photo-electric cell. This method of controlling the frequency of a multi-vibrator type oscillator with the frequency of an external source of alternating current is quite conventional so that no further description of the multi-vibrator is considered necessary. In this way, the output frequency of the multi-vibrator 26 is automatically maintained equal to the frequency of the electric current output of the photo-electric cell 38.

The apparatus is supplied with electric energy from a source of power 56 to a power unit 58 through a main switch 60 and an automatically controlled switch 62. From the power unit 58, electric energy, including the necessary vacuum tube plate voltages and other required voltages, is supplied to the A. V. C. circuit 42, the multi-vibrator 26 and the various amplifiers as schematically illustrated in the drawing. If the power source 56 is an alternating source of electric power, the unit 58 will include the necessary rectifier means to provide the direct current voltages required by the various vacuum tube circuits.

The switch 62 must be manually closed and is adapted to automatically open when a winding 64 is energized. The arrangement is such that the winding 64 and switch 62 are quite sensitive so that the switch 62 opens as soon as there is a small flow of current through the winding 64. The winding 64 is connected in series with a manually operable switch 66 and the circuit through the winding 64 and switch 66 is completed if a tuned reed relay switch 68 closes or if a vacuum tube 70 becomes conductive.

The grid of the vacuum tube 70 is connected to the plate 72 of a rectifier tube 74 through a filter comprising a resistance 76 and a condenser 78. The plate 72 of the rectifier tube 74 is connected to the ungrounded end of the resistance 46. With this construction, the grid of the tube 70 is automatically maintained at a negative value as long as the tube 44 has an output signal thereby maintaining the tube 70 non-conductive. Accordingly, if the output of the photo-electric cell 38 or the amplifier 40 fails for any reason, then the potential of the grid of the tube 70 automatically becomes zero to render the tube conductive thereby energizing the winding 64 and opening the switch 62 to interrupt the power supply, the switch 66 being assumed to be closed.

The tuned reed relay contact 68 is adapted to be engaged by a reed 80 when the reed vibrates. The reed 80 is adjustably clamped between two sets of rollers 82 such that the effective length of the reed may be varied by its longitudinal adjustment relative to said rollers. A solenoid winding 84 is connected to the output circuit of the multi-vibrator 26 through an amplifier 86. The solenoid winding 84 is arranged to cause vibrations of the reed 80 when the frequency of the current flowing through the solenoid winding 84 is equal to the natural frequency of vibration of the reed 80. When the reed vibrates at its natural frequency, its amplitude is sufficient to engage the contact 68 thereby completing a circuit to the winding 64 (switch 66 being closed) to open the sensitive switch 62 and interrupt the supply of electric energy.

A suitable counter 88 may be connected to the output circuit of the amplifier 86 through a switch 90 so that, when the switch 90 is closed, the counter counts the number of cycles of the output signal of the oscillator, this being equal to the number of vibrations of the test specimen 10. In addition, suitable electric meters 92 and 94 may be provided to measure respectively the output of the photo-electric cell amplifier 40 and its frequency.

The aforedescribed apparatus may be operated as follows: The test specimen 10 is clamped between the jaws 12, the switches 66 and 90 are opened and the switches 60 and 62 are closed. In addition, the A. V. C. circuit contact 48 and the amplitude control contact 30 are set for a small or minimum volume. The contact 27 of the multi-vibrator is now adjusted until the output frequency of the multi-vibrator corresponds to a natural frequency of the test specimen. When this occurs, the frequency of the electric current in the magnet windings 22 and 24 becomes equal to the natural frequency of the test specimen thereby inducing relatively large resonant vibrations in the test specimen. The operator can tell when the frequency of the multi-vibrator has been adjusted to a natural frequency of the test specimen from the resulting large vibrations of the test specimen itself or from the indication of the meter 92. The A. V. C. circuit contact 48 and the amplitude control contact 30 are now set for the desired volume thereby determining the maximum amplitude of the vibration of the test specimen and the maximum stress in the test specimen resulting from its vibration. The switch 90 is now closed to count the vibrations of the test specimen.

The effective length of the reed 80 is adjusted until its natural frequency is only slightly less than the natural frequency at which the test specimen is vibrating. This is accomplished by adjusting the effective length of the reed 80 until it starts to vibrate. At this point, the natural frequency of the reed is equal to the frequency of vibration of the test specimen. Then, the effective length of the reed 80 is increased slightly so as to decrease its natural frequency. The switch 66 is now closed.

The apparatus may now be left unattended while the multi-vibrator 26 automatically maintains the frequency of the electric current in the magnet windings 22 and 24 exactly equal to the frequency of vibration of the test specimen 10 and the A. V. C. circuit 42 automatically maintains constant the amplitude of these vibrations. The specimen continues to vibrate until a slight flaw or failure develops in the specimen thereby decreasing its natural frequency. When the specimen develops a flaw the frequency of its vibrations decrease and therefore the frequency of the pulsating output of the photo-electric cell 38 likewise decreases. When this frequency decreases to the value for which the reed 80 is set, the reed 80 starts to vibrate thereby completing a circuit to the sensitive winding 64 which immediately opens the switch 62 to interrupt the supply of energy to the apparatus. Accordingly, as soon as a slight flaw develops in the test specimen, the magnetic forces exciting vibrations of the test specimen are interrupted and the counter 88 indicates the total number of vibrations of the specimen prior to its failure.

With this operation of the vibration testing apparatus, a test specimen may be caused to vibrate at a natural frequency and at any desired amplitude of vibration for any length of time or until a flaw develops in the specimen. The maximum stress induced in the test specimen as a result of its vibration may be computed from its amplitude of vibration if the test specimen is of a relatively simple geometric shape. If the test specimen is of irregular shape, stresses in the specimen may be determined by securing a strain gage or gages thereto. The number of vibrations of the test specimen before a flaw develops is automatically determined by the counter 88. In this way, the fatigue and vibration characteristics of a test specimen may readily be determined. It should be noted that it is not essential that the test specimen be made of magnetic material since, if it is not, a layer of magnetic material may be suitably bonded—for example, to the outer edge of the test specimen.

As illustrated and described, the test specimen is supported as a cantilever beam by clamping at one end. Obviously, however, the test specimen may be supported so as to accommodate any desired mode of vibration.

As used in the appendant claims, the term "photo-electric cell" is intended to cover all forms of photo-electric responsive means in which an electric current, voltage or impedance can be made to vary with changes in the intensity or quantity of light.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Vibration testing apparatus comprising a light source; a photo-electric cell; means for mounting a specimen to be tested so that in the neutral position of said specimen the portion of the photo-sensitive surface of said cell adjacent to one margin of said surface is exposed to light from said source while the portion of said surface remaining and disposed adjacent to the opposite margin of said surface is unexposed to said light and as said specimen vibrates back and forth the magnitude of said exposed surface portion increases and decreases at a frequency equal to the frequency of said vibrations and to an extent dependent on the magnitude of said vibrations whereby the frequency and amplitude of the resulting pulsating electric output of said cell varies respectively with the frequency and amplitude of said vibrations; electric means for forcing vibrations of said specimen; means for supplying a varying electric current to said electric means for subjecting said specimen to a pulsating force for vibrating said specimen; and means responsive to the output of said cell for controlling the electric current supplied to said electric means.

2. Vibration testing apparatus comprising a light source; a photo-electric cell; means for mounting a specimen to be tested so that in the neutral position of said specimen it extends only part way into a light beam directed from said source to said cell so as to leave the portion of the photo-sensitive surface of said cell adjacent to one margin of said surface exposed to said light and so as to shield the remaining portion of said surface disposed adjacent to the opposite margin of said surface from said light whereby as said specimen vibrates back and forth the magnitude of said exposed surface portion increases and decreases at a frequency equal to the frequency of said vibrations and to an extent dependent on the magnitude of said vibrations and whereby the frequency and amplitude of the resulting pulsating electric output of said cell varies respectively with the frequency and amplitude of said vibrations; an electric magnet; means for supplying a varying electric current to said magnet for subjecting said specimen to a pulsating magnetic force for vibrating said specimen; and means responsive to the output of said cell for controlling the frequency and amplitude of the varying electric current supplied to said magnet.

IRVING MENDELSON.

REFERENCES CITED

The following references are of record in the file of this patent:

UNITED STATES PATENTS

| Number | Name | Date |
|---|---|---|
| 2,361,396 | Gross | Oct. 31, 1944 |

FOREIGN PATENTS

| Number | Country | Date |
|---|---|---|
| 397,167 | Great Britain | Aug. 14, 1933 |